United States Patent
Bringewatt et al.

(10) Patent No.: US 11,192,725 B2
(45) Date of Patent: Dec. 7, 2021

(54) METHOD AND DEVICE FOR FEEDING LAUNDRY ITEMS TO A MANGLE OR THE LIKE

(71) Applicant: Herbert Kannegiesser GmbH, Vlotho (DE)

(72) Inventors: Wilhelm Bringewatt, Porta Westfalica (DE); Jürgen Sielermann, Heubach (DE); Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 0 days.

(21) Appl. No.: 16/897,379

(22) Filed: Jun. 10, 2020

(65) Prior Publication Data

US 2020/0391957 A1 Dec. 17, 2020

(30) Foreign Application Priority Data

Jun. 14, 2019 (DE) .......................... 102019004146.1
Aug. 14, 2019 (DE) .......................... 102019005696.5

(51) Int. Cl.
*B65G 47/24* (2006.01)
*D06F 11/00* (2006.01)
(Continued)

(52) U.S. Cl.
CPC ............. *B65G 47/24* (2013.01); *B65G 15/30* (2013.01); *B65G 37/00* (2013.01); *B65G 47/14* (2013.01);
(Continued)

(58) Field of Classification Search
CPC ........ B65G 47/24; B65G 47/57; B65G 15/30; B65G 2201/0229; B65G 15/12;
(Continued)

(56) References Cited

U.S. PATENT DOCUMENTS 3,399,472 A * 9/1968 Evans .................... D06F 67/04
38/143
4,106,227 A * 8/1978 Allen .................... D06F 67/04
38/143
(Continued)

FOREIGN PATENT DOCUMENTS

DE 1812572 A1 * 1/1970 ............. D06F 67/04
DE 102016012274 A1 11/2017
(Continued)

OTHER PUBLICATIONS

Deutsches Patent-Und Markenamt (German Patent and Trademark Office), Recherchebericht (search in a related application), Mar. 16, 2020.
(Continued)

*Primary Examiner* — Mark A Deuble
(74) *Attorney, Agent, or Firm* — Laurence P. Colton; Smith Tempel Blaha LLC

(57) ABSTRACT

For washed laundry items, such as flat laundry items, that have been separated into singles, spread out and fed to a mangle or the like, for automating these processes a method and device for pulling the singles onto a belt conveyor with a front transverse edge region transversely to the feed direction. Using a guide means in front of the belt conveyor, a front transverse edge of the laundry item is aligned at right angles to the feed direction when being pulled. Once pulled on, the laundry item is centered with respect to the track center of the following transfer conveyor by the belt conveyor. From the belt conveyor the laundry item is placed on a following transfer conveyor where the front transverse edge of the laundry item is aligned at right angles to the feed direction and a sagging of the transverse edge of the laundry item is eliminated.

17 Claims, 9 Drawing Sheets

(51) Int. Cl.
*B65G 47/57* (2006.01)
*B65G 15/30* (2006.01)
*B65G 47/30* (2006.01)
*B65G 37/00* (2006.01)
*B65G 47/14* (2006.01)

(52) U.S. Cl.
CPC .............. *B65G 47/30* (2013.01); *B65G 47/57* (2013.01); *D06F 11/00* (2013.01); *B65G 2201/0229* (2013.01)

(58) Field of Classification Search
CPC ........ B65G 15/22; B65G 37/00; B65G 47/12; B65G 47/14; B65G 47/32; B65G 47/53; D06F 11/00; D06F 67/04
See application file for complete search history.

(56) References Cited

U.S. PATENT DOCUMENTS

| | | | | |
|---|---|---|---|---|
| 4,437,247 A | * | 3/1984 | Wiebesiek | D06F 67/04 38/143 |
| 4,553,662 A | * | 11/1985 | Munch Jensen | D06F 67/04 198/456 |
| 4,885,853 A | * | 12/1989 | McCabe | D06F 67/04 38/143 |
| 5,440,810 A | * | 8/1995 | Borucki | D06F 67/04 38/143 |
| 5,611,159 A | * | 3/1997 | Jensen | D06F 67/04 38/143 |
| 6,826,856 B1 | * | 12/2004 | McCabe | D06F 67/04 38/143 |
| 2008/0092415 A1 | | 4/2008 | McCabe | |
| 2009/0266749 A1 | * | 10/2009 | Heinz | D06F 93/00 209/580 |
| 2012/0308339 A1 | * | 12/2012 | McCabe | D06F 95/00 414/13 |
| 2014/0291123 A1 | * | 10/2014 | Olivieri | D06F 95/00 198/617 |
| 2016/0145055 A1 | * | 5/2016 | Sielermann | B65G 47/90 414/751.1 |
| 2018/0347104 A1 | | 12/2018 | McCabe | |

FOREIGN PATENT DOCUMENTS

| | | | |
|---|---|---|---|
| EP | 0620310 A1 | 10/1994 | |
| EP | 0424290 B1 * | 2/1995 | ............. D06F 67/04 |
| JP | 2010273732 A | 12/2010 | |
| WO | 2017060226 A1 | 4/2017 | |

OTHER PUBLICATIONS

European Patent Office, Europaischer Recherchenbericht (search in a related application), Aug. 25, 2020.

* cited by examiner

METHOD AND DEVICE FOR FEEDING LAUNDRY ITEMS TO A MANGLE OR THE LIKE

CROSS REFERENCE TO RELATED APPLICATIONS

The present patent application claims priority on and the benefit of German Patent Application No. 10 2019 004 146.1 having a filing date of 14 Jun. 2019 and German Patent Application No. 10 2019 005 696.5 having a filing date of 14 Aug. 2019.

BACKGROUND OF THE INVENTION

Technical Field

The invention relates to a method for feeding laundry items to a mangle or the like, wherein the laundry items are automatically separated into singles, the respective singled-out laundry item being spread out and transported to the mangle or the like with a transverse edge extending transversely to the feed direction by at least one feed conveyor. In addition, the invention relates to a device for feeding laundry items to a mangle or the like, having a separator for automatically separating the laundry items into singles, at least one clamp for capturing the respective singled-out laundry item and for transferring the same to a conveyor, and having at least one conveyor which transports the laundry item in the feed direction.

Prior Art

Washed laundry, above all flat laundry, is mangled or smoothed in another way after washing and, where applicable, the subsequent dewatering and/or drying connected thereto. The washing and drying of the laundry are effected in batches. In contrast, the laundry items are smoothed, in particular mangled, individually, in the spread-out state. Consequently, the feeding of laundry items to the mangle or the like requires multiple consecutive operating steps.

Automatically separating the laundry items, dried in batches, into singles is known. The subsequent feeding of separated laundry items to the mangle or the like, in contrast, is only effected, to date, in a part-automated manner.

BRIEF SUMMARY OF THE INVENTION

The object underlying the invention is to create an automatic, in particular fully automatic, method for feeding laundry items to a mangle or the like and a corresponding device, both of which ensure a large throughput and a high degree of reliability.

A method for achieving said object comprises a method for feeding laundry items to a mangle or the like, wherein the laundry items are automatically separated into singles, the respective singled-out laundry item being spread out and transported to the mangle or the like with a transverse edge extending transversely to the feed direction by at least one feed conveyor, characterized in that the singled-out laundry item, held by a clamp at a longitudinal edge portion proceeding from a corner of the transverse edge, is transferred by the clamp with at least one transverse edge region proceeding from the beginning of the transverse edge to a belt conveyor which extends transversely to the feed direction, the belt conveyor transports the laundry item in front of a transfer conveyor and centers it with respect to the center of the transfer conveyor which extends in the feed direction. Said method provides assigning the, in each case automatically separated, laundry item automatically to a clamp which holds a longitudinal edge portion of the laundry item proceeding from a corner of a front transverse edge. The clamp transfers at least a beginning of a transverse edge region of the laundry item proceeding from the transverse edge to a belt conveyor extending transversely to the feed direction. In this case, the transverse edge region of the laundry item is pulled by the clamp onto the belt conveyor transversely to the feed direction.

The belt conveyor transports at least the transverse edge region of the laundry item resting thereon, preferably the entire laundry item, in front of a transfer conveyor. At the same time or following this, the belt conveyor centers the laundry item, at least a transverse edge region resting on the belt conveyor, centrally with respect to the transfer conveyor.

The laundry item is then placed, preferably by the belt conveyor, with the transverse edge region and the transverse edge leading it onto the transfer conveyor, which aligns at least the transverse edge of the laundry item at right angles to the input direction before the laundry item is either transported directly to the mangle by the transfer conveyor or transfers to a following feed conveyor which finally transports the laundry item to the mangle or the like and inputs it into the same.

A respective automatically separated laundry item can be fed and/or input fully automatically or at least part-automatically into a mangle or another such laundry machine by means of all or, as an alternative to this, only some, preferably selected, above-mentioned method steps, in particular the sequence of the same. A high degree of reliability of the feed and input operation with, at the same time, a high feed performance (number of input laundry items per unit time) is ensured by the targeted consecutive method steps.

In the case of an advantageous design possibility of the method, the clamp holds the longitudinal edge portion proceeding from a corner of the transverse edge in a stretched manner. As a result, with the laundry item held by the clamp, the transverse edge region of the laundry item is realized, in particular under the clamp. As a result of the longitudinal edge portion held stretched in the clamp, the transverse edge region is realized in a preferred manner, proceeding from the clamp, in a spread-out manner.

In a preferred manner, the clamp is realized as a double clamp with two clamp jaws spaced apart from one another for holding the longitudinal edge portion in a stretched manner. The region of the longitudinal edge portion located between the clamp jaws is stretched as a result, in particular is held approximately linearly between the clamp jaws.

The method can be developed advantageously by a guide means being assigned to the belt conveyor. The guide means is preferably arranged upstream of the belt conveyor with reference to a conveying direction of the belt conveyor transversely and/or at right angles to the input direction, by the guide means being situated laterally upstream of the belt conveyor with reference to the feed direction. When the transverse edge region is pulled onto the belt conveyor, the guide means guides the transverse edge region of the respective laundry item, proceeding under the longitudinal edge portion held in a stretched manner by the clamp, transversely, in particular at right angles or at least approximately at right angles to the feed direction. This results in at least an approximate alignment or pre-alignment of the front transverse edge of the laundry item perpendicularly to the feed direction.

The guide means is realized in a preferred manner as at least one alignment drive.

It is provided according to an advantageous development of the method to fix the transverse edge region of the laundry item on the belt conveyor, preferably its upper run. Said fixing is preferably effected pneumatically by negative pressure or suction air. In this way, the transverse edge region of the laundry item is held on the upper run no later than after being pulled onto the upper run of the belt conveyor, preferably already whilst being pulled onto the upper run of the belt conveyor, so that by means of a drive of the belt conveyor, in particular of its upper run, transversely to the feed direction, the transverse edge region of the laundry item is entrained by the upper run of the belt conveyor and as a result is pulled onto the belt conveyor. As a result of the fixing of the transverse edge region on the upper run of the belt conveyor, the belt conveyor can also center the transverse edge region and consequently the laundry item in a substantially slip-free manner centrally in front of the transfer conveyor so that the center of the laundry item moves in front of the or the respective track center of the transfer conveyor.

Another advantageous development of the method provides determining, in the region of the belt conveyor, in particular on the belt conveyor, the width of the laundry item, in particular the dimension of the laundry item transversely to the feed direction. Said width of the laundry item transversely to the feed direction corresponds in a preferred manner to the length of its transverse edge. In said context, "transverse edge" means that the relevant front edge of the laundry item extends transversely to the feed direction. In the event of rectangular laundry items, this can be either or optionally the long side (longitudinal side) or the short side (transverse side). The invention is consequently not limited to the long or short side as transverse edge. A targeted movement of the upper run of the belt conveyor entraining the laundry item as a result of the front transverse edge region of the laundry item being fixed on the upper run of the belt conveyor, is effected in dependence on the determined length measurement of the front transverse edge of the laundry item. Said targeted movement of the belt conveyor, in particular of its upper run with the respective laundry item, is effected in such a manner that, in this connection, the laundry item is centered centrally in front of the transfer conveyor and/or the laundry item, with reference to the respective placement track of the laundry item on the transfer conveyor, is centered with reference to its feed or placement track.

A further advantageous design possibility of the method provides determining the progression of the front transverse edge of the laundry item on the transfer conveyor with sensors. This can occur as a result of a series of consecutive sensors extending transversely to the feed direction, preferably a sensor strip, above or below the upper run of the transfer conveyor, but also as a result of at least one camera, a light barrier or the like. By means of a subsequently targeted independent drive of multiple adjacent belts of the transfer conveyor, the front transverse edge of the laundry item is then displaced in such a manner that it extends at right angles to the feed direction. In this case, the independent drive of all or groups of multiple adjacent belts of the transfer conveyor is controlled by the result of the preceding sensory determination and/or scanning of the progression of the front transverse edge of the laundry item after the placing of the front transverse edge of the laundry item by the belt conveyor onto the beginning of the transfer conveyor. In this way, a feed and transfer of the respective laundry item to a mangle or the like with a transverse edge of the laundry item extending precisely at right angles to the feed direction and/or aligned linearly or at least approximately linearly is ensured.

A device for achieving the object named in the introduction comprises a device for feeding laundry items to a mangle or the like, having a separator for automatically separating the laundry items into singles, at least one clamp for capturing the respective singled-out laundry item and for transferring the same to a conveyor, and having at least one conveyor which transports the laundry item in the feed direction, characterized in that the at least one clamp is realized for holding a longitudinal edge portion of the laundry item, proceeding from a corner of a transverse edge which extends transversely to the feed direction, in front of the conveyor, the conveyor being realized as a belt conveyor which extends transversely to the feed direction for receiving a transverse edge region of the laundry item proceeding from the front transverse edge and for displacing the same transversely to the feed direction. It is provided, in this connection, to realize the at least one clamp in front of the conveyor for holding a longitudinal edge portion of the laundry item proceeding from a corner of the transverse edge, the conveyor being realized as a belt conveyor which extends transversely to the input direction for receiving the front transverse edge region of the laundry item and for displacing the same transversely to the feed direction. As an alternative to this or in addition to it, a transfer conveyor following the belt conveyor in the feed direction is provided for aligning the front transverse edge of the respective laundry item at right angles to the feed direction. Said device makes it possible, once the laundry items have been automatically separated into singles, to feed a respectively separated laundry item automatically to the transfer conveyor in a centrally centered manner and/or to align it by the transfer conveyor at right angles to the feed device. This enables laundry items to be fed automatically in a reliable and rapid manner to a mangle or another laundry machine.

The device is preferably developed such that the clamp for holding a longitudinal edge portion, proceeding from a corner of the transverse edge, of the respective laundry item is realized as a double clamp preferably with two spaced apart clamp jaws. Such a double clamp can hold the longitudinal edge portion of the laundry item that it holds in a stretched manner between its two spaced apart clamp jaws. As a result, the double clamp can transfer the front transverse edge region of the respective laundry item in a targeted and/or stretched manner automatically to the belt conveyor, in particular can pull it onto the belt conveyor.

According to an advantageous development possibility of the device, its belt conveyor extends transversely to the feed direction in front of and/or above the transfer conveyor. As a result, the laundry item can be reliably placed with a transverse edge portion onto the beginning of the feed conveyor automatically in a targeted manner by the belt conveyor, preferably centrally onto the transfer conveyor.

Another design possibility of the device provides realizing an upper run of the belt conveyor for receiving and/or for fixing the front transverse region of the respective laundry item. As a result of the fixing of the front transverse edge region of the respective laundry item on the upper run of the belt conveyor, the laundry item can be centered in front of the transfer conveyor with its transverse edge region fixed on the upper run of the belt conveyor. In addition, the fixing of the front transverse edge region of the laundry item on the upper run of the belt conveyor supports the transfer of the transverse edge region from the clamp, in particular double clamp, to the upper run of the belt conveyor.

It is additionally provided, in a preferred manner, for a measuring device to be assigned to the belt conveyor for determining the length of the front transverse edge of the laundry item. When viewed in the feed direction, said length of the front transverse edge corresponds to the width or length of the laundry item, in dependence on whether the laundry item is to be fed to the mangle or the like oriented longitudinally or transversely.

As an alternative to this or in addition to it, it is provided that a drive of the belt conveyor is controllable in dependence on the determined length or width of the front transverse edge of the laundry item in such a manner that by moving the upper run of the belt conveyor correspondingly in the one or other direction transversely to the feed direction, the laundry item can be centered centrally with respect to the transfer conveyor. Said central centering can be undertaken precisely and by way of the length or width of the front transverse edge of the laundry item determined beforehand by the measuring device.

A preferred development of the device provides assigning at least one guide means, preferably at least one alignment drive, to the belt conveyor. Said at least one guide means is assigned to the belt conveyor, in particular arranged upstream thereof, in such a manner that the clamp or double clamp pulls the transverse edge region of the respective laundry item when it is being transported to the belt conveyor, in particular when it is pulled onto the same, transversely to the feed direction via and/or by means of the at least one guide means, as a result of which said guide means aligns the front transverse edge at least approximately transversely to the feed direction. As a result, a pre-alignment of the front transverse edge of the laundry item is already performed by the belt conveyor.

In addition, the device is realized such that the transfer conveyor comprises multiple adjacent conveyor belts transversely to the feed direction for transporting the respective laundry item in the feed direction and/or to the feed conveyor following the transfer conveyor. In a preferred manner, the adjacent conveyor belts or groups of multiple adjacent conveyor belts are drivable independently from one another. As a result, an automatic right-angled alignment of the front transverse edge of the respective laundry item to the feed direction and consequently also to the transfer conveyor and/or to the feed conveyor, preferably a sandwich feed conveyor, can be produced.

According to an advantageous development of the device, a detection device is assigned to the transfer conveyor for detecting the progression and/or position of the front transverse edge of the respective laundry item relative to the feed direction. With said detection device, possible deviations of the front transverse edge from the right-angled progression to the feed direction and/or any sagging of the front transverse edge of the laundry item possibly still present can be determined. If it is ascertained during said determining that the front transverse edge does not lie at right angles to the feed direction on the transfer conveyor and/or the front transverse edge still sags too much in an inadmissible manner, the sagging and/or a non-right-angled progression of the front transverse edge of the respective laundry item to the feed direction can be automatically eliminated by a targeted drive of the adjacent conveyor belts or groups of multiple adjacent conveyor belts.

BRIEF DESCRIPTION OF THE DRAWINGS

Preferred exemplary embodiments of the invention are explained in more detail below by way of the drawings, in which.

DETAILED DESCRIPTION OF PREFERRED EMBODIMENTS

Figure 1:
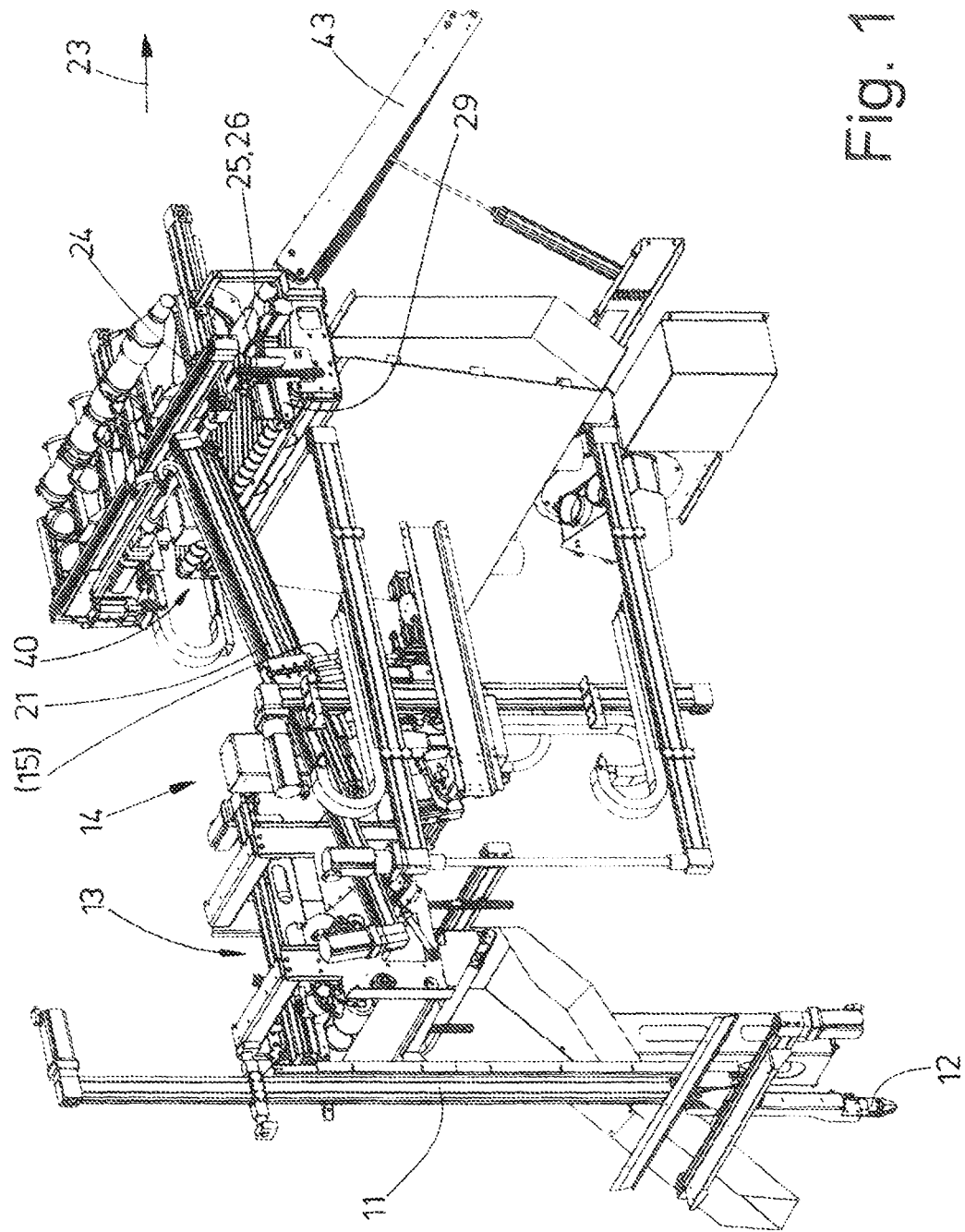
FIG. 1 shows a simplified perspective schematic diagram of the device.

The device shown in the figures serves for the fully automatic feeding of laundry items to a mangle or to another laundry machine, for example a folding machine. Said device is also suitable, in particular, for carrying out the method according to the invention for feeding laundry items to a mangle or the like.

FIGS. 5 to 9 show a laundry item 10 as an example. Said laundry item 10 is a flat laundry item, for example a tablecloth, a bedsheet, a bed cover, a pillow cover or, where applicable, also a napkin. The invention, however, is not limited to these.

The laundry items 10 are fed to the device as piles of laundry after washing and, where applicable, drying and/or loosening.

The device has a gripper 12 which is movable up and down along an ascending transport track 11 which is formed, for example, by a shuttle cylinder. The gripper 12 is realized for gripping an arbitrary position preferably of one single laundry item 10 from the laundry pile. Multiple laundry items 10 are occasionally gripped by the gripper 12 from the laundry piles at the same time. This is why a separator 13 is arranged downstream of the gripper 12. By the gripper 12 moving along the transport track 11, a first laundry item 10 or multiple laundry items 10 reach the separator 13 which performs a final separation of laundry items 10 possibly gripped by the gripper 12 at the same time. For details of the gripper 12, the transport track 11 and the separator 13, reference is made to DE 10 2016 012 274 A1.

A separated laundry item 10 is fed or provided by the separator 13 to a following transport system 14. A first moveable clamp of said transport system 14 grips the individual laundry item 10 provided by the separator 13 at an arbitrary position of an edge, preferably a corner or a corner region. By transfer to one or multiple clamps of the transport system 14 which are movable along various transport tracks, the laundry item 10 is re-oriented. This occurs in such a manner that a last clamp 15 of the transport system 14 can grip a longitudinal edge portion 18, proceeding from a corner 16 of a front transverse edge 17 of the laundry item 10, of a longitudinal edge 19 of the laundry item 10. Said longitudinal edge portion 18 delimits in a lateral manner a transverse edge region 20 of the laundry item 10 proceeding from the front transverse edge. The clamp 15 is realized as a double clamp with two spaced part clamp jaws. As a result, the clamp 15, with its spaced apart clamp jaws, is capable of holding adjacent ends of the longitudinal edge portion 18 in a stretched manner. The part of the longitudinal edge portion 18 situated between the two clamp jaws of the clamp 15 is stretched as a result, preferably held by the clamp 15 extending approximately linearly. The clamp 15 is formed so as to be longitudinally movable on a transport track 21, which is formed, for example, by a shuttle cylinder, movable to a following clamp 22 which is preferably also realized as a double clamp with two spaced apart clamp jaws for holding the longitudinal edge portion 18 of the laundry item 10 in a stretched manner. Said clamp 22 is movable transversely, in particular at right angles, to the feed direction 23 of the laundry item 10 to the mangle or another laundry machine not shown in the figures. The clamp 22 is preferably movable along a further transport track 24 which can also be formed by a shuttle cylinder. Said transport track 24 also extends transversely, preferably at right angles, to the feed direction 23, in a horizontal manner.

The transport track 24 and the clamps 22 that are movable along the same are arranged above a conveyor preferably realized as a belt conveyor 25. Said belt conveyor 25 extends, as the transport track 24 parallel above it, transversely, in particular at right angles to the feeding direction 23, also extending horizontally. The length of the belt conveyor 25 (transversely to the feed direction 23) corresponds to the length of the front transverse edge 17 of the largest laundry item 10 to be fed to the mangles or the like. The width of the belt conveyor 25 is chosen such that it can receive the front transverse edge region 20 of a respective laundry item 10. As a result, the width of the belt conveyor 25 corresponds at least to the length of the longitudinal edge portion 18 of a respective laundry item 10. The belt conveyor 25 has a narrow—relative to its length—rotatingly drivable conveyor belt, the upper run 26 of said belt conveyor being realized to receive the transverse edge region 20 of the respective laundry item 10. By means of a corresponding drive which is preferably controlled by sensors, the upper run 26 is movable in a targeted manner in the longitudinal direction of the belt conveyor 25 transversely to the feed direction 23, in particular extending at right angles to the feed direction 23.

The belt conveyor 25 has assigned thereto a measuring device for determining the length of the front transverse edge 17 of the laundry item 10 pulled onto the upper run 26 of the belt conveyor 25. By way of the length of the front transverse edge 17 of the laundry item 10 determined by said measuring device, the drive of the belt conveyor 25 is controlled for the automatic aligning and/or centering of the laundry item 10 to be carried out by said belt conveyor relative to a following transfer conveyor 40 or the like.

Below a front side edge of the belt conveyor 25, when seen in the feed direction 23, there is a continuous suction surface 27 over the entire length of the belt conveyor 25 for fixing a transverse edge strip of the same to the transverse edge region 20 of the laundry item 10. The suction surface 27 lies in a vertical plane below the front side edge of the belt conveyor 25 and, in the exemplary embodiment shown, has a uniform grid of suction bores 28 that can be acted upon with negative pressure.

Figure 2:
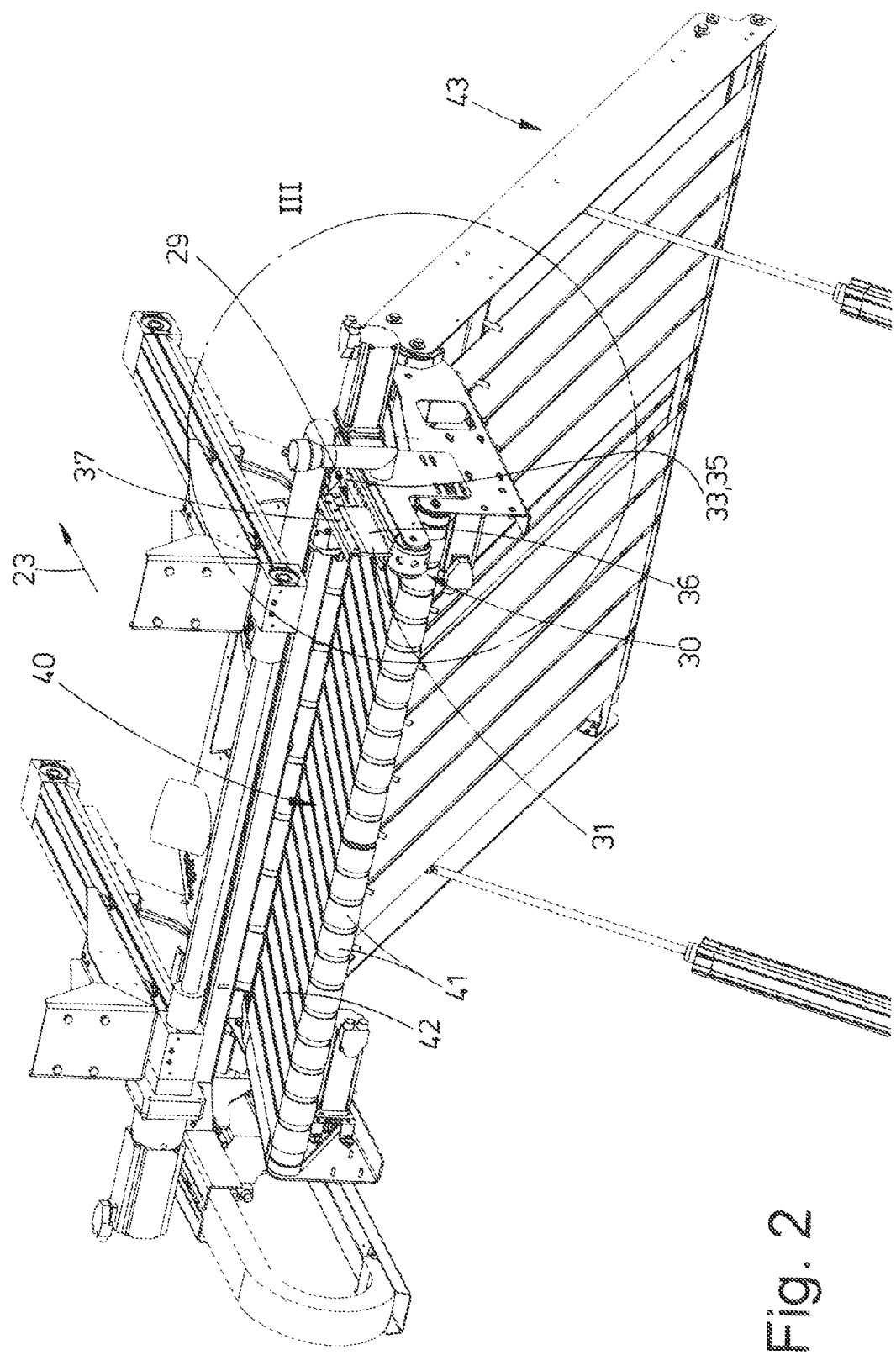
FIG. 2 shows a perspective view of the rear part of the device with a belt conveyor, a transfer conveyor and a feed conveyor.
Figure 3:
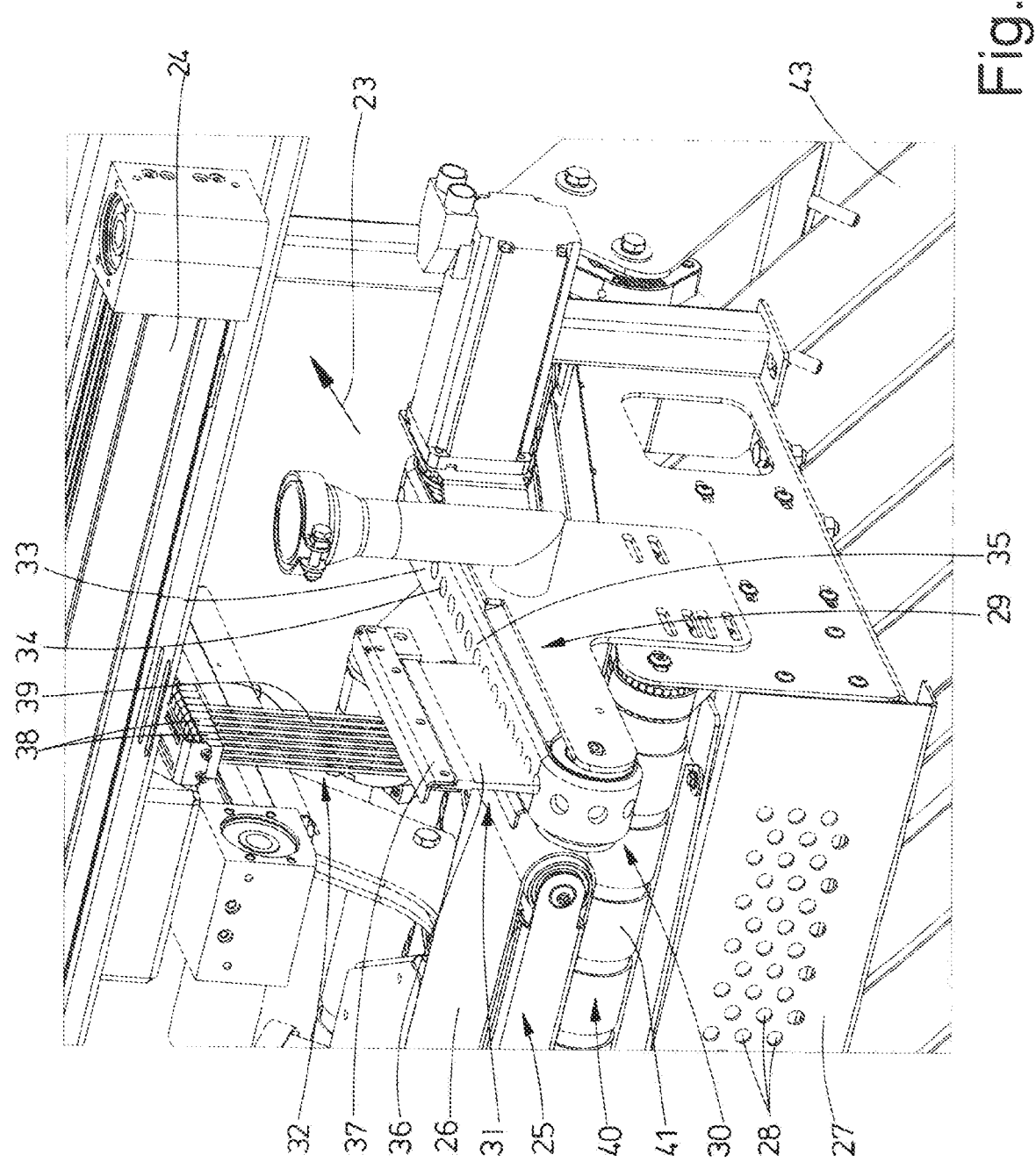
FIG. 3 shows a detail III from FIG. 2 in the region of an alignment drive for pre-aligning a transverse edge of the laundry item.
Figure 4:
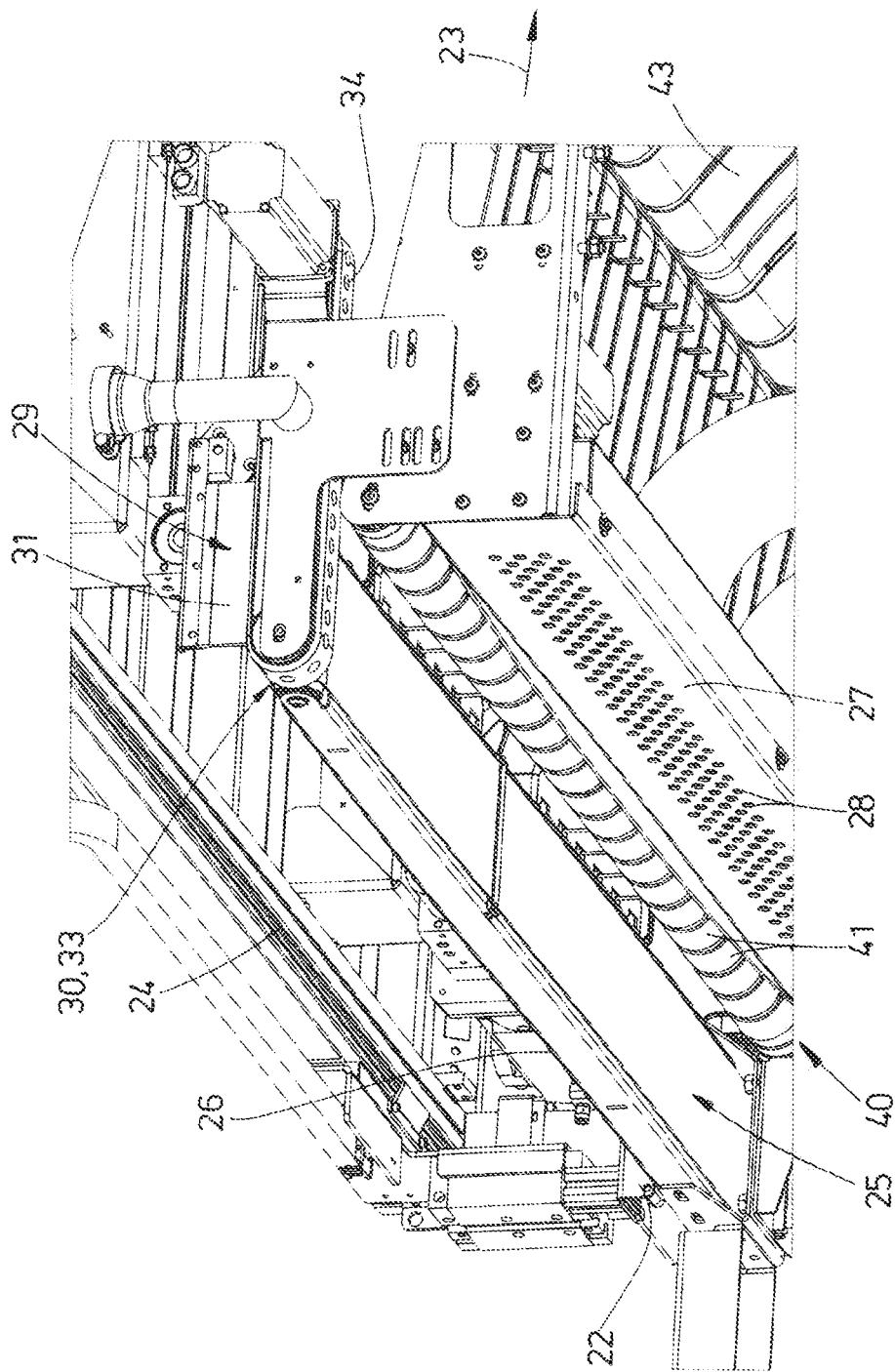
FIG. 4 shows a perspective view of the device shown in FIG. 2 from another viewing direction (a bottom view diagonally from the front)
Figure 5:
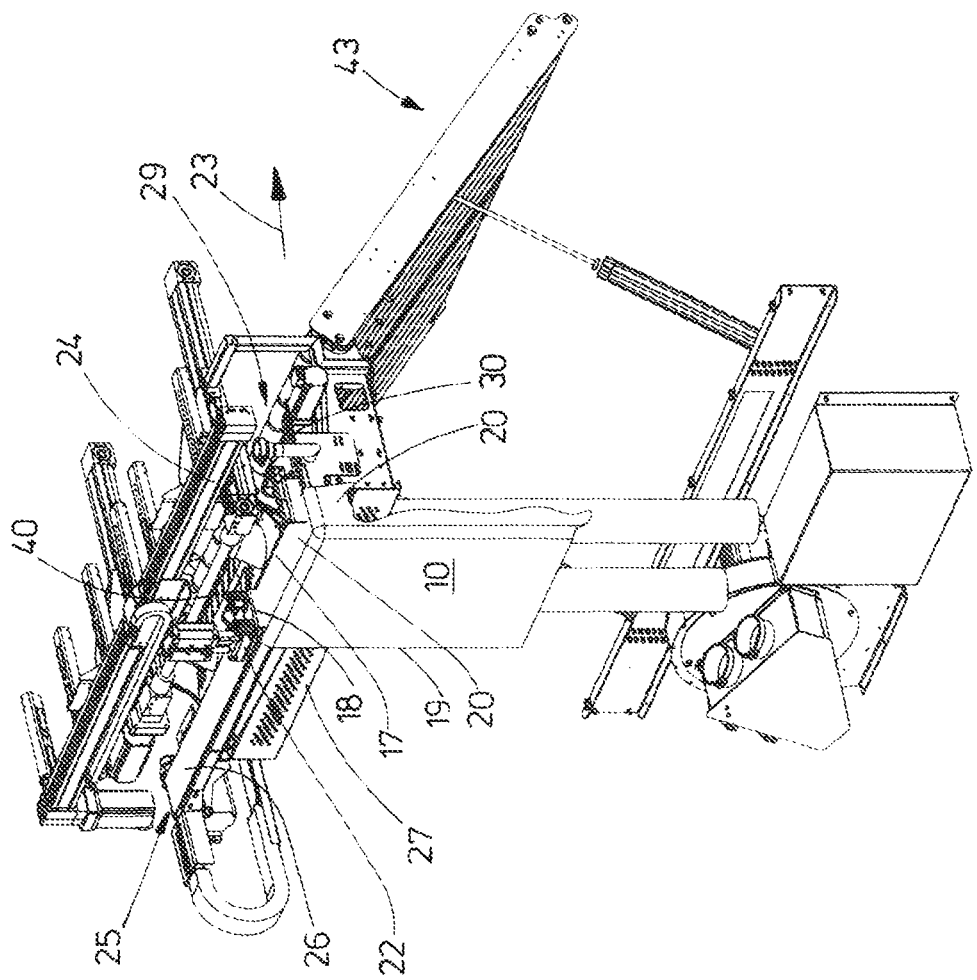
FIG. 5 shows part of the device of FIGS. 2 to 4 with a laundry item in the early stages of being pulled onto the belt conveyor.
Figure 6:
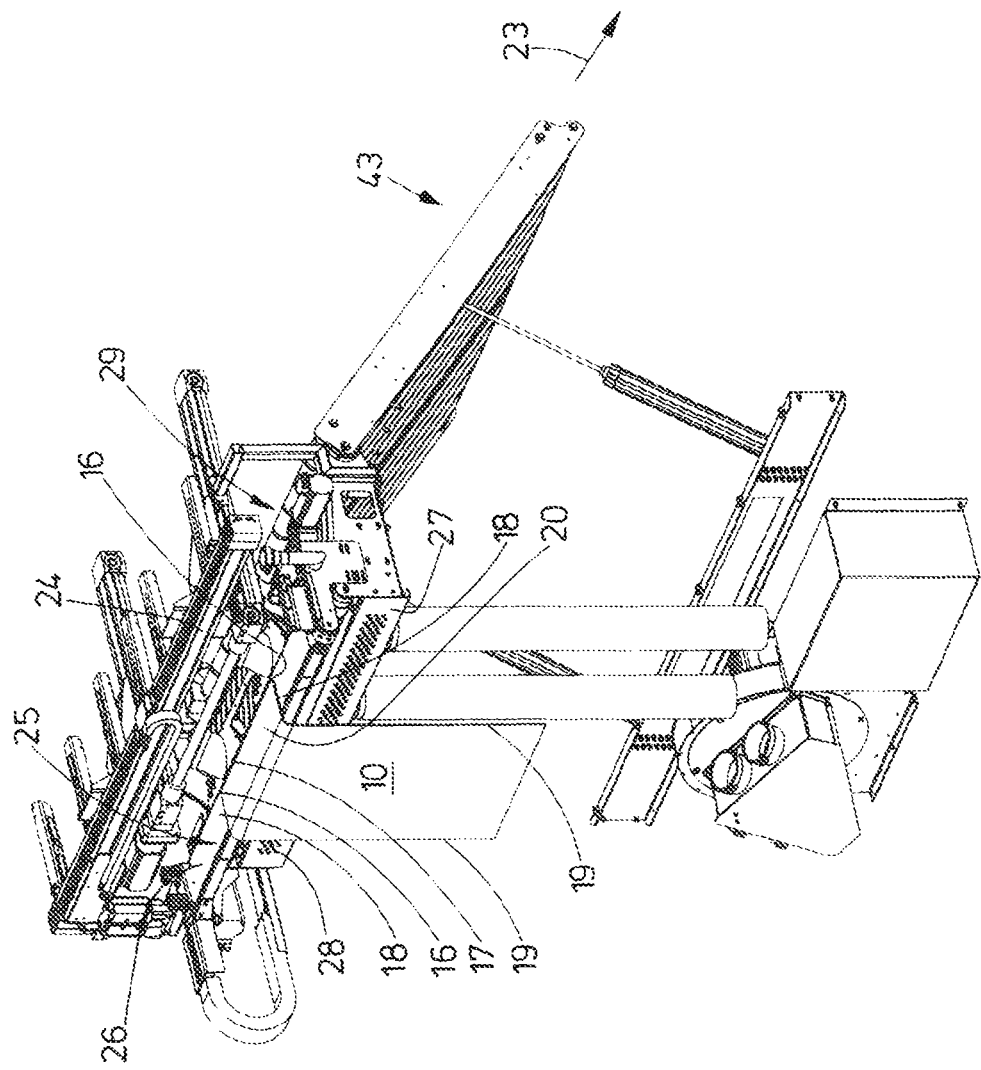
FIG. 6 shows a representation analogous to FIG. 5 with the laundry item centered by the belt conveyor.

The beginning of the belt conveyor 25, from where the transverse edge region 20 of the respective laundry item 10 is feedable to said belt conveyor, has assigned thereto a guide means (FIGS. 2 to 4). In the exemplary embodiment shown, the guide means is situated in front of the beginning of the belt conveyor 25. The guide means shown in the figures is realized as an alignment drive 29. It has, for this reason, an alignment conveyor 30, a retainer 31 and a sensor curtain 32.

The alignment conveyor 30 extends in the feed direction 23. Its conveyor belt 33 is provided with at least one continuous row of suction bores 34. The suction bores 34 can be supplied with suction air for fixing the laundry item 10 on an upper run 35 of the conveyor belt 33. The upper run 35 of the conveyor belt 33 lies approximately in a common horizontal plane with the upper run 26 of the belt conveyor 25.

The retainer 31 is arranged above the upper run 35 of the conveyor belt 33 of the guide means. The retainer 31 has at least one pull-on brush 36 which is preferably formed by at least one brush strip of, for example, rubber or plastics material and, as a result, is elastically deformable. The width of the pull-on brush 36 corresponds approximately to the width of the upper run 26 of the belt conveyor 25. The pull-on brush 36 is fastened to a pivot arm 37 which is vertically pivotable by a suitable pivot drive proceeding from the upper run 35 of the conveyor belt 33 from the active position pivoted down shown for example in FIG. 3, as a result of which a beginning of the transverse edge region 20 of the laundry item 10 is positionable between the upper run 35 of the conveyor belt 33 and the lower side of the pull-on brush 36 at the beginning of the pulling-on of the same onto the belt conveyor 25.

When viewed in the pull-on direction of the laundry item 10 onto the belt conveyor 25, the sensor curtain 32 is arranged behind the retainer 31, in particular behind its pull-on brush 36. The sensor curtain 32 is generated by multiple sensors preferably of the same type arranged in the feed direction 23 adjacent one another and behind one another, in particular closely behind one another, the sensors being able to belong to a sensor strip 38. Sensor beams 39 proceeding from each of the adjacent sensors preferably of the sensor strip 38 are clearly visible in FIG. 3 by parallel lines. The sensor curtain 32 formed in this way is situated in a vertical plane which extends longitudinally to the feed direction 23. The sensor beams 39 are directed to the upper run 35 of the conveyor belt 33 or to a space or a detection plate between the upper run 35 of the conveyor belt 33 and the upper run 26 of the belt conveyor 25. As a result, they detect the position of the front transverse edge 17 of the laundry item 10 relative to the rear side edge of the upper run 26 of the belt conveyor 25 when the laundry item 10 is pulled onto the belt conveyor 25. The progression of the transverse edge region 20 when it is pulled onto the belt conveyor 25 is detected with the sensor strip 38 and said progression is actively influenced and, if necessary, corrected by the alignment drive 29.

Figure 7:
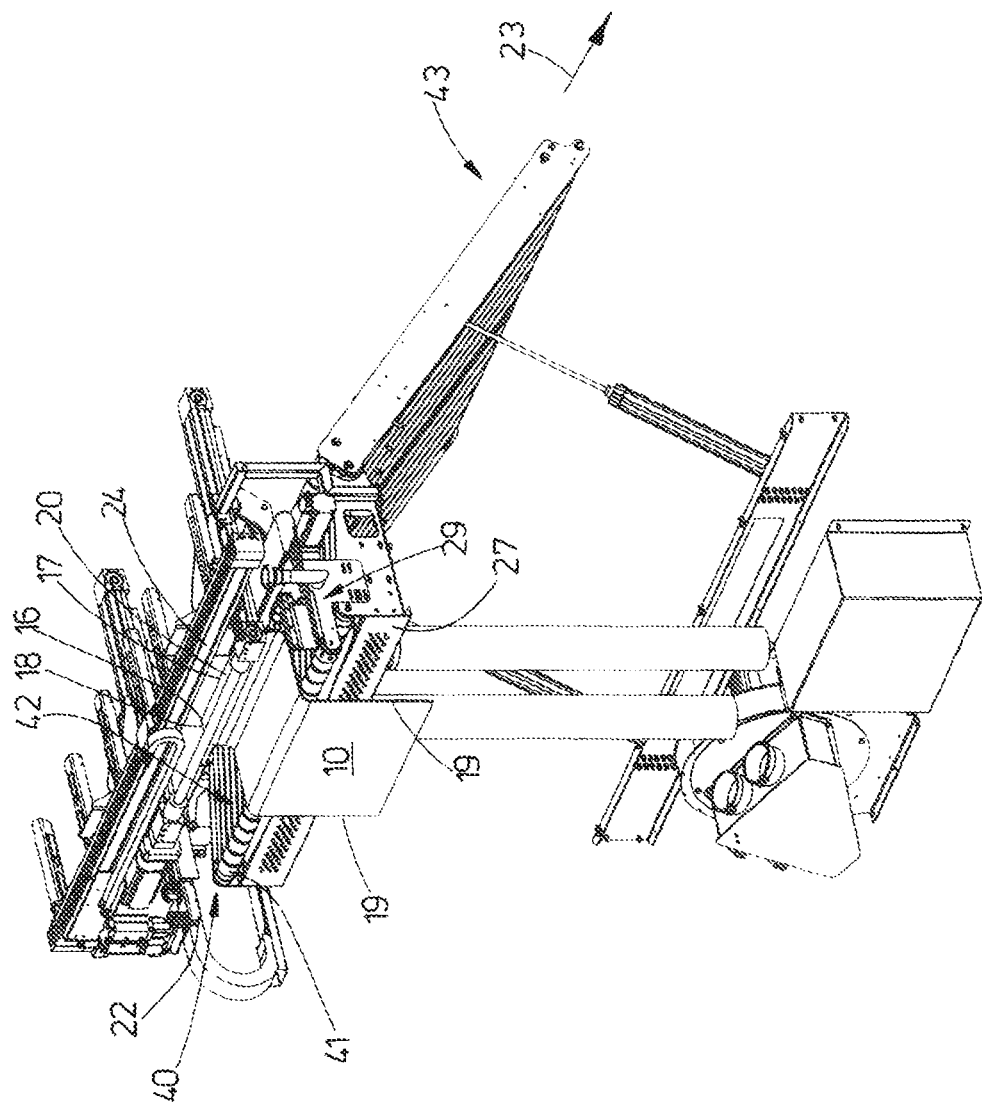
FIG. 7 shows a representation analogous to FIGS. 5 and 6 with the laundry item placed on the transfer conveyor by the belt conveyor.

When seen in the feed direction 23, the transfer conveyor 40 is arranged behind and below the belt conveyor 25. The transport direction of the transfer conveyor 40 extends in the feed direction 23. The transfer conveyor 40 is formed from multiple narrow conveyor belts 41 which are adjacent one another preferably at a small distance transversely to the feed direction 23. By displacing the belt conveyor 25 extending transversely to the feed direction 23 in the feed direction 23, at least the front transverse edge region 20 of the respective laundry item 10 is transferable, in particular can be pulled, by the belt conveyor 25 onto an upper run 42 of the transfer conveyor 40 lying in a horizontal plane, and, in this case, can be placed with a leading front transverse edge 17 on the upper run 42 of the transfer conveyor 40, preferably the upper runs of the adjacent, narrow conveyor belts 41 of the transfer conveyor 40 (FIGS. 7 to 9).

Figure 8:
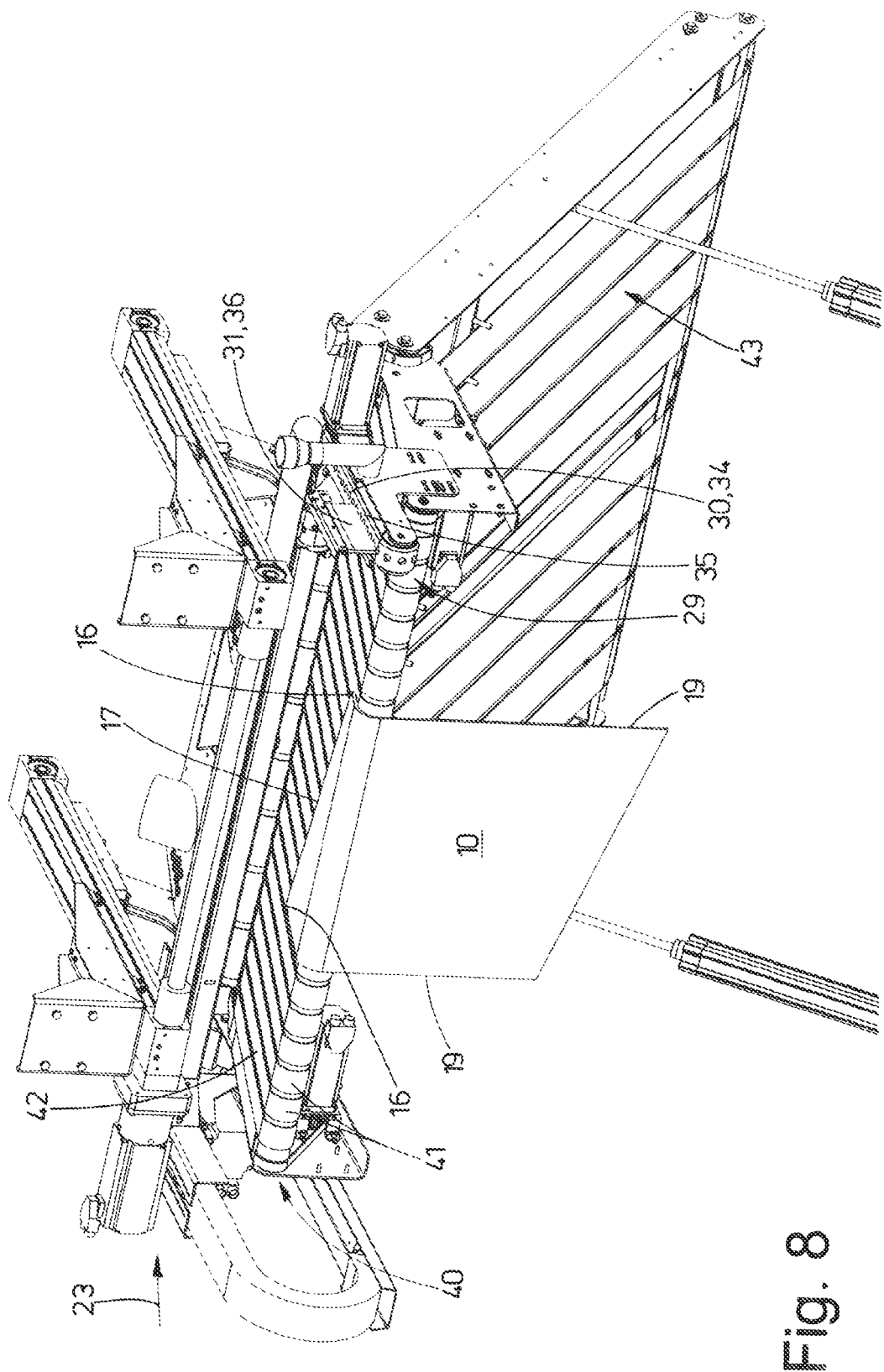
FIG. 8 shows a perspective representation of the laundry item placed onto the transfer conveyor and not yet aligned or only pre-aligned.
Figure 9:
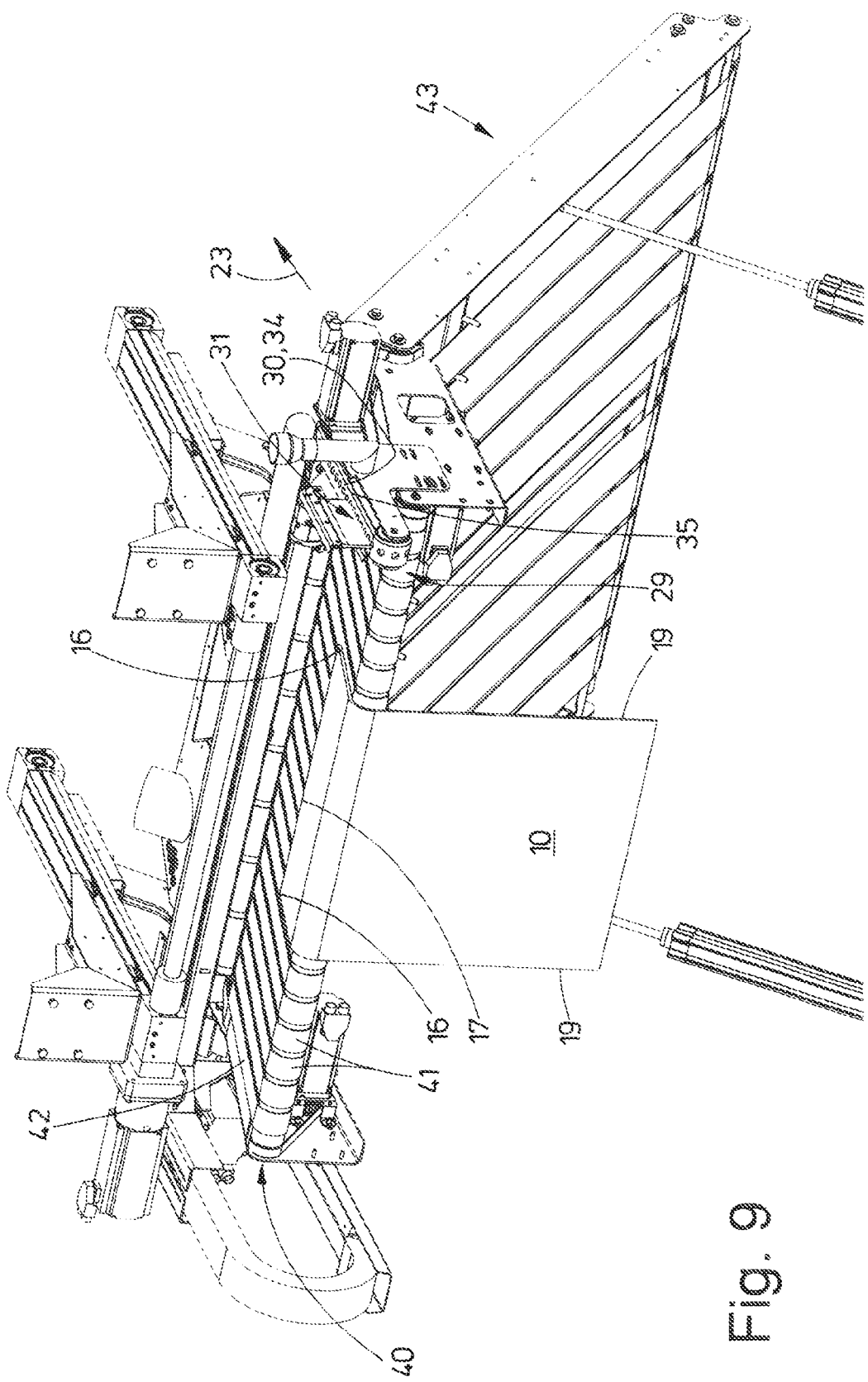
FIG. 9 shows a view analogous to FIG. 8 with the laundry item placed on the feed conveyor and aligned.

FIG. 8 shows the case where, after transferring or pulling at least part of the front transverse edge region 20 of the laundry item 10 onto the transfer conveyor 40, the front transverse edge 17 of the relevant laundry item 10 does not yet extend at right angles to the feed direction 23. In this case, the front transverse edge 17 of the laundry item 10 is re-oriented by the transfer conveyor 40 such that the front transverse edge 17 extends at right angles to the feed direction 23 of the transfer conveyor 40 (FIG. 9). For the purposes of said alignment, each conveyor belt 41 of the transfer conveyor 40 or, as an alternative to this, groups of multiple conveyor belts 41 of the transfer conveyor 40 is/are individually drivable independently of one another.

The right-angled alignment of the front transverse edge 17 of the respective laundry item 10 is controlled with respect to the feed direction 23 by sensors shown in the figures, for example light barriers which are arranged, for example, above the transfer conveyor 40 in a row extending at right angles to the feed direction 23. The targeted and needs-based independent drive of the conveyor belts 41 or groups of multiple conveyor belts 41 is effected in such a manner and until the front transverse edge 17 of the laundry item 10 is detected by all the sensors of the row extending transversely to the feed direction 23 of multiple adjacent sensors.

Once the front transverse edge 17 of the laundry item 10 has been aligned in this way at right angles to the feed direction 23, the laundry item 10 is transported onward in the feed direction 23 by the transfer conveyor 40, either directly to the mangle or the like or—according to the exemplary embodiment shown—to a feed conveyor 43 following the transfer conveyor 40 which then transports the laundry item 10 to the mangle or another laundry treatment machine and inputs it into the same, in particular conveys it in. The feed conveyor 43 can be realized as a sandwich conveyor with part conveyors one above another.

The method according to the invention is explained below with reference to the device described beforehand:

One single laundry item 10 is preferably gripped from the laundry pile by the gripper 12 and fed to the separator 13. The separator 13 carries out full separation into singles, where applicable, of multiple laundry items 10 gripped at the same time by the gripper 12. One single laundry item 10 is held ready in each case by the separator 13 at an arbitrary position at the beginning of the transport system 14, in particular a first clamp 15 of the same. In the course of the transport system 14, the laundry item 10 is transported to the beginning of the belt conveyor 25 and is held ready there by the clamp 15, realized preferably as a double clamp, such that it can be taken over by a clamp 22 which is movable along the transport track 21 which extends transversely to the feed direction 23. The two spaced-apart clamp jaws of the clamp 22 realized as a double clamp grip adjacent ends of the transverse edge region 20 of the laundry item 10, so that the portion of the transverse edge region 20 held between the clamp jaws is stretched between the clamp jaws. In this case, at least one of the two clamp jaws of the double clamp 22 is moved relative to the other clamp jaw such that the distance between the two clamp jaws with respect to one another increases and, as a result, the transverse edge region 20 of the laundry item 10 held between the moved-apart clamp jaws is pretensioned. The clamp 22 then holds the transverse edge region 20 stretched between its two clamp jaws.

Once the clamp 22 has taken over the laundry item 10 and holds a longitudinal edge portion 18 of the laundry item 10 in a stretched manner, the laundry item is situated with the longitudinal portion 18 in front of the beginning of the belt conveyor 25 and also in front of the alignment drive 29 assigned thereto. Before the clamp 22 holding the longitudinal edge portion 18 is then moved along the transport track 21 extending transversely to the feed direction 23, the pivot arm 27 holding the pull-on brush 36 of the alignment drive 29 is pivoted up. As a result, with the initial movement of the clamp 22 transversely to the feed direction 23, the longitudinal edge portion 18 of the laundry item 10, with the following beginning of the transverse edge region 20, can move past the pivot arm 37 onto the upper run 35 of the alignment conveyor 30 of the alignment drive 29. Then, as a result of pivoting the pivot arm 27 of the retainer 31 downward, the pull-on brush 36 of the same is moved toward the top side of the transverse edge region 20, up until the flexible lower edge of the pull-on brush 36 abuts elastically against the transverse edge region. In this way, the transverse edge region 20 is transversely aligned, that is to say in the direction extending in parallel to the longitudinal edge portion 18 delimited at the bottom by the upper run 35 of the alignment conveyor 30 and at the top by the lower edge of the pull-on brush 36 of the retainer 31 of the alignment drive 29. As a result, during further movement of the clamp 22 transversely to the feed direction 23, the transverse edge region 20 of the laundry item 10, directed transversely to the feed direction 23, is pulled onto the upper run 26 of the belt conveyor 25.

The sensor curtain 32 is assigned to the alignment drive 29. When viewed in the pull-on direction of the transverse edge region 20 onto the belt conveyor 25, it is arranged downstream of the retainer 31. When the laundry item 10 is pulled onto the upper run 26 of the belt conveyor 25, the sensor curtain 32 scans the front transverse edge 17 of the laundry item 10 contactlessly, the distance between the front transverse edge 17 in the region of the sensor curtain 32 and, when viewed in the feed direction 23, the rear transverse edge of the belt conveyor 25. If the sensor curtain 32 then ascertains that when the transverse edge region 20 is pulled further onto the belt conveyor 25, the distance between the front transverse edge 17 and the rear transverse edge of the belt conveyor 25 changes, a correction to the distance between the front transverse edge 17 of the laundry item 10 and the rear transverse edge of the belt conveyor 25 can take place by a movement of the alignment conveyor 30 of the alignment drive 29 in or against the feed direction 23. This ensures that the clamp 22 pulls the transverse edge region 20 of the laundry item 10 onto the upper run 26 of the belt conveyor 25 at a right angle to the feed direction 23.

So that when aligning the laundry item 10 by moving the alignment conveyor 30, the laundry item 10 is also entrained by the upper run 35 of the alignment conveyor 30, the strip of the transverse end region 20 of the laundry item 10 located in each case on the upper run 35 of the alignment conveyor 30 is fixed on the upper run 35 as a result of the suction bore 34 in the conveyor belt 33 being acted on with negative pressure. On account of said fixing, the laundry item 10 can also be pulled along under the bottom edge of the pull-on brush 36 of the retainer 31 when the transverse edge region 20 is aligned.

Once the movement of the clamp 22 effected transversely to the feed direction 23 along the transport track 24 via or by means of the alignment drive 29 and via the belt conveyor 25 has been carried out such that the longitudinal edge portion 18 following the leading longitudinal edge portion 18 of the laundry item 10 is situated on the upper run 26 of the belt conveyor 25, the two clamp jaws of the clamp 22 are opened, as a result of which the entire length of the transverse edge region 20 of the laundry item 10 (with reference to the direction of the transverse edge 17) is now situated on the upper run 26.

As a result of a preferred air-permeable realization of the conveyor belt of the belt conveyor 25 or a perforation of the same, the transverse edge region 20 of the laundry item 10 is fixable on the upper run 26 of the belt conveyor 25 by negative pressure and/or suction.

After placing and fixing the transverse edge region 20 onto the upper run 26 of the belt conveyor 25, the laundry item 10 is centered by said belt conveyor with respect to a longitudinal centre line of the transfer conveyor 40 extending in the feed direction 23. This occurs by moving the upper run 26 of the belt conveyor 25 transversely to the feed direction 23. In this case, opposite longitudinal edge portions 18 of the transverse edge region 20 of the laundry item 10 are detected by means of sensors assigned to the belt conveyor 25 and the upper run 26 is moved in such a manner that the distances between the opposite longitudinal portions 18 of the transverse edge region 20 are at the same distance away from the longitudinal center axis of the transfer conveyor 40 extending in the feed direction 23. Automatic centering of the laundry item 10 with reference to the longitudinal center line of the transfer conveyor 40 extending in the feed direction 23 is effected in this way. As a result, the laundry item is automatically centered by the belt conveyor 25 with respect to the longitudinal center line and consequently to the track center of the transfer conveyor 40. As an alternative to this, the automatic centering can also be effected by way of the result of a previous length or width measurement of the front transverse edge 17 of the length of the transverse edge region 20 of the laundry item 10. As an alternative to this, it can also be provided, in particular when the laundry items 10 have, for example, patterns, to position the laundry items 10 by the belt conveyor 25 in a targeted manner out-of-center in front of the transfer conveyor 40.

Once the laundry item 10 has been centered by the belt conveyor 25 with reference to the track center of the transfer conveyor 40, a transfer of the transverse edge region 20 of the laundry item 10 is effected from the upper run 26 of the belt conveyor 25 to the beginning of the transfer conveyor 40, onto the common upper run 42 of the transfer conveyor 40 formed by the upper runs of the adjacent narrow conveyor belts 41, by a movement of the belt conveyor 25 effected in the feed direction 23 with the transverse edge region 20 of the laundry item 10 fixed on the upper run 26. For the purposes of said transfer, the belt conveyor 25 is moved away in the feed direction 23 above the beginning region of the transfer conveyor 40. The suction surface 27, lying in a vertical plane extending transversely to the feed direction 23 under the front end of the transfer conveyor 40, is activated as soon as the belt conveyor 25 is situated above the beginning of the transfer conveyor 40. This occurs as a result of the suction bores 28 in the suction surface 27 being acted upon by negative pressure. As a result, a portion of the laundry item 10 connecting to the transverse edge region 20 is temporarily fixed below and in front of the transfer conveyor 40 and, as a result, the laundry item 10 is held back at the transfer from the belt conveyor 25 to the beginning of the transfer conveyor 40. By moving the belt conveyor 25 further in the feed direction 23, the transverse edge portion 20 can then be pulled down from the upper run 26 of the belt conveyor 25 and can move onto the upper run 40 at the beginning of the transfer conveyor 40, in particular can be placed here in a fold-free manner. The upper run 26 of the belt conveyor 25 is preferably no longer acted upon with negative pressure during said transfer or operation placing the transverse edge region 20 onto the transfer conveyor 40.

After the front transverse edge region 20 of the laundry item 10 has been placed onto the beginning of the transfer conveyor 40, the acting on the suction bores 28 of the suction surface 27 with negative pressure is preferably also cancelled. The laundry item 10 can now be forwarded in the feed direction 23 by the transfer conveyor 40.

As a result of a sensor device or camera, not shown in the figures, in the initial region of the transfer conveyor 40, the progression of the front transverse edge 17 of the laundry item 10 after placing the transverse edge region 20 onto the beginning of the transfer conveyor 40 can be detected. If the front transverse edge 17 does not extend at right angles to the feed direction 23, said front transverse edge 17 is aligned automatically by a targeted drive of the adjacent conveyor belts 41 of the transfer conveyor 40 such that the front transverse edge 17 of the laundry item 10 extends at right angles to the feed direction 23 (FIG. 9). Possible sagging of the front transverse edge of the laundry item 17 can also be eliminated, where applicable, in an analogous manner. The respective laundry item 10 is then centered centrally with respect to the track center or longitudinal center line of the transfer conveyor 40 and, with the front transverse edge 17 extending at right angles to the feed direction 23, can be forwarded in the feed direction 23 precisely aligned and positioned.

In the case of the device shown, where the feed conveyor 43 follows the transfer conveyor 40, the respective laundry item 10 is transported by the transfer conveyor 40 to the feed conveyor 43 and transferred to said feed conveyor. From the feed conveyor 43, the laundry item 10 is then transported to the mangle or another laundry treatment device and input into said treatment device.

All method steps mentioned in conjunction with the above description of the method run automatically, in particular fully automatically, and are controlled by corresponding sensor devices or image capturing devices.

The method according to the invention is not limited to only the device described in the introduction according to FIGS. 1 to 9, it can also be carried out with other devices which are realized such that they permit realization of all or, where applicable, of only the essential of the method steps described.

LIST OF REFERENCE NUMBERS

Laundry item
Transport track
Gripper
Separator
Transport system
Clamp
Corner
Front transverse edge
Longitudinal edge portion
Longitudinal edge
Transverse edge region
Transport track
Clamp
Feed direction
Transport track
Belt conveyor
Upper run
Suction surface Suction bore
Alignment drive
Alignment conveyor
Retainer
Sensor curtain
Conveyor belt
Suction bore
Upper run
Pull-on brush
Pivot arm
Sensor strip
Sensor beam
Transfer conveyor
Conveyor belt
Upper run (of 40)
Feed conveyor

What is claimed is:

1. A method for feeding laundry items (10) to a mangle, wherein the laundry items (10) are automatically separated into singles, the respective singled-out laundry item (10) being spread out and transported to the mangle with a transverse edge (17) extending transversely to the feed direction (23) by at least one transfer conveyor (40) or by a feed conveyor (43) following the transfer conveyor (40), comprising transferring the singled-out laundry item (10), held by a clamp (22) at a longitudinal edge portion (18) proceeding from a corner (16) of the transverse edge (17), by the clamp (22) with at least one transverse edge region (20) proceeding from the beginning of the transverse edge (17) to a belt conveyor (25) which extends transversely to the feed direction (23), the belt conveyor (25) transporting the laundry item (10) in front of the transfer conveyor (40) and centers it with respect to the center of the transfer conveyor (40) which extends in the feed direction (23).

2. The method as claimed in claim 1, wherein the laundry item (10) is placed with the transverse edge region (20) on the transfer conveyor (40) which aligns the transverse edge (17) of the laundry item (10) at right angles to the feed direction (23).

3. The method as claimed in claim 1, further comprising a guide means (29) arranged upstream of the belt conveyor (25), said guide means guiding and aligning the transverse edge region (20) of the respective laundry item (10) at right angles to the feed direction (23) when it is pulled onto the belt conveyor (25).

4. The method as claimed in claim 1, wherein the transverse edge region (20) of the respective laundry item (10) is fixable on the belt conveyor (25).

5. The method as claimed in claim 1, wherein the transverse edge region (20) of the laundry item is placed by a clamp (22) on the upper run (26) of the belt conveyor (25) as a result of pulling at least one initial portion of the transverse edge region (20) transversely to the feed direction (23) onto the upper run (26) of the belt conveyor (25).

6. The method as claimed in claim 1, further comprising, with the upper run (26) of the belt conveyor (25) extending at right angles to the feed direction (23), transporting the laundry item (10) resting with at least part of the front transverse edge region (20) on the upper run (26) by a drive of the belt conveyor (25) centrally in front of the transfer conveyor (40) and at the same time is centered.

7. The method as claimed in claim 1, further comprising determining the width of the laundry item (10), which corresponds to the length of the front transverse edge (17) of the laundry item (10), on the belt conveyor (25) and in dependence on the determined width, centering the respective laundry item (10) centrally in front of the transfer conveyor (40) as a result of a targeted movement of the upper run (26) of the belt conveyor (25).

8. The method as claimed in claim 1, further comprising determining the progression of the front transverse edge (17) of the respective laundry item (10) on the transfer conveyor (40) and, as a result of subsequent targeted, independent drive of adjacent conveyor belts (41) of the transfer conveyor (40), displacing the front transverse edge (17) of the respective laundry item (10) in such a manner that it extends at right angles to the feed direction (23).

9. A device for feeding laundry items (10) to a mangle, having a separator (13) for automatically separating the laundry items (10) into singles, at least one clamp (22) for capturing the respective singled-out laundry item (10) and for transferring the same to a conveyor, and having at least one additional conveyor which transports the laundry item (10) in a feed direction (23), wherein the at least one clamp (22) is realized for holding a longitudinal edge portion (18) of the laundry item (10), proceeding from a corner (16) of a transverse edge (17) which extends transversely to the feed direction (23), in front of the conveyor, the conveyor being realized as a belt conveyor (25) which extends transversely to the feed direction (23) for receiving a transverse edge region (20) of the laundry item (10) proceeding from the front transverse edge (17) and for displacing the same transversely to the feed direction (23).

10. The device as claimed in claim 9, wherein when viewed in the feed direction (23), a transfer conveyor (40), which is realized for aligning the front transverse edge (17) of the respective laundry item (10) at right angles to the feed direction (23), follows the transversely directed belt conveyor (25).

11. The device as claimed in claim 9, wherein the clamp (22) is realized as a double clamp with two clamp jaws spaced apart from one another for holding in a stretched manner the longitudinal edge portion (18) of the laundry item (10) which proceeds from a corner (16) of the front transverse edge (17).

12. The device as claimed in claim 9, wherein the belt conveyor (25) extends at right angles to the feed direction (23).

13. The device as claimed in claim 9, wherein an upper run (26) of the belt conveyor (25) is realized at least for receiving the transverse edge region (20) of the respective laundry item (10).

14. The device as claimed in claim 9, wherein the belt conveyor (25) has assigned thereto a measuring device for determining the length of the front transverse edge (17) of the respective laundry item (10) and a drive of the belt conveyor (25) is controllable in dependence on the determined length of the front transverse edge (17) of the laundry item (10) in such a manner that as a result of a corresponding movement of the upper run (26) of the belt conveyor (25) at right angles to the feed direction (23), the laundry item (10) can be centered centrally with reference to the transfer conveyor (40).

15. The device as claimed in claim 9, wherein the belt conveyor (25) has assigned thereto a guide means in such a manner that the clamp (22) pulls the transverse edge region (20) of the respective laundry item (10) during transport to the belt conveyor (25) at right angles to the feed direction (23) via or as a result of the guide means and said guide means, in this case, aligns the front transverse edge (17) of the respective laundry item (10) at least approximately perpendicularly to the feed direction (23).

16. The device as claimed in claim 10, wherein the transfer conveyor (40) comprises multiple conveyor belts

(41) adjoining at right angles to the feed direction (23) for transporting the respective laundry item (10) in the feed direction (23) and the conveyor belts (41) or groups of multiple adjoining conveyor belts (41) are drivable independently of one another for aligning the front transverse edge (17) of the respective laundry item (10) at right angles to the feed direction (23).

17. The device as claimed in claim 10, wherein the transfer conveyor (40) has assigned thereto at least one detection device for detecting the progression of the front transverse edge (17) of the respective laundry item (10) relative to the feed direction (23).

* * * * *